United States Patent
Seagraves et al.

(10) Patent No.: US 10,913,473 B2
(45) Date of Patent: Feb. 9, 2021

(54) DOLLY WITH AUTOMATED HEIGHT ADJUSTMENT

(71) Applicant: Ford Motor Company, Dearborn, MI (US)

(72) Inventors: Jamel Seagraves, Dearborn, MI (US); Chih-Wei Tang, Dearborn, MI (US); Sudipto Aich, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/339,047

(22) PCT Filed: Oct. 4, 2016

(86) PCT No.: PCT/US2016/055335
§ 371 (c)(1),
(2) Date: Apr. 3, 2019

(87) PCT Pub. No.: WO2018/067127
PCT Pub. Date: Apr. 12, 2018

(65) Prior Publication Data
US 2020/0039551 A1   Feb. 6, 2020

(51) Int. Cl.
| | |
|---|---|
| *B62B 1/00* | (2006.01) |
| *B62B 1/12* | (2006.01) |
| *B62B 1/14* | (2006.01) |
| *B62B 5/00* | (2006.01) |
| *B66F 9/24* | (2006.01) |

(52) U.S. Cl.
CPC ............... *B62B 1/12* (2013.01); *B62B 1/14* (2013.01); *B62B 5/0009* (2013.01); *B66F 9/24* (2013.01); *B62B 2203/10* (2013.01); *B62B 2206/06* (2013.01)

(58) Field of Classification Search
CPC .......... B62B 1/12; B62B 3/0637; B62B 3/04; B62B 9/16
See application file for complete search history.

(56) References Cited

U.S. PATENT DOCUMENTS

| | | | | |
|---|---|---|---|---|
| 3,385,401 A | * | 5/1968 | Campbell ................. | B66B 9/16 187/222 |
| 4,042,124 A | * | 8/1977 | Bowdry, III ......... | B65G 59/045 414/788.2 |
| 4,239,443 A | * | 12/1980 | Rysewyk .................. | B66F 9/06 414/618 |
| 4,865,515 A | * | 9/1989 | Dorner ................. | B65G 57/302 414/788.2 |
| 5,695,173 A | * | 12/1997 | Ochoa ..................... | B66F 7/065 254/10 C |

(Continued)

*Primary Examiner* — Hau V Phan
(74) *Attorney, Agent, or Firm* — Brandon Hicks; Eversheds Sutherland (US) LLP

(57) ABSTRACT

A dolly includes an actuated platform and obstruction sensor as well as a camera and a depth sensor. The eye height of a user is determined according to outputs of the camera and depth sensor. The platform is then moved to an elbow height determined based on the eye height and the depth sensor is moved to a position above the platform. In response to detecting obstruction of the obstruction sensor, the platform is lowered. Upon completion of loading, the platform is lowered to a lowest position. A stand may be retracted upon lowering of the platform to its lowest position.

19 Claims, 11 Drawing Sheets

(56) References Cited

U.S. PATENT DOCUMENTS

| | | | |
|---|---|---|---|
| 7,014,197 B2* | 3/2006 | Baldwin | B62B 3/04 |
| | | | 280/47.27 |
| 7,913,975 B2* | 3/2011 | Haynes | B65G 57/165 |
| | | | 254/133 R |
| 2003/0178259 A1* | 9/2003 | Henderson | B66B 9/04 |
| | | | 187/275 |
| 2005/0110232 A1* | 5/2005 | DiBenedetto | B62B 3/0637 |
| | | | 280/47.29 |
| 2008/0166215 A1* | 7/2008 | Haynes | B65G 59/106 |
| | | | 414/788.2 |
| 2008/0230321 A1* | 9/2008 | Csaszar | B66B 9/16 |
| | | | 187/244 |
| 2011/0243696 A1* | 10/2011 | DiBenedetto | B66F 9/06 |
| | | | 414/490 |

* cited by examiner

DOLLY WITH AUTOMATED HEIGHT ADJUSTMENT

BACKGROUND

Field of the Invention

This invention relates to a dolly, e.g. hand truck, and, in particular, a dolly that includes actuated platforms for loading and unloading.

Background of the Invention

The traditional dolly has been modified to include many additional features such as adjustable platform height, self-balancing wheels, remote controlled directional movement, and the like to facilitate the transporting and handling of large items, such as boxes.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
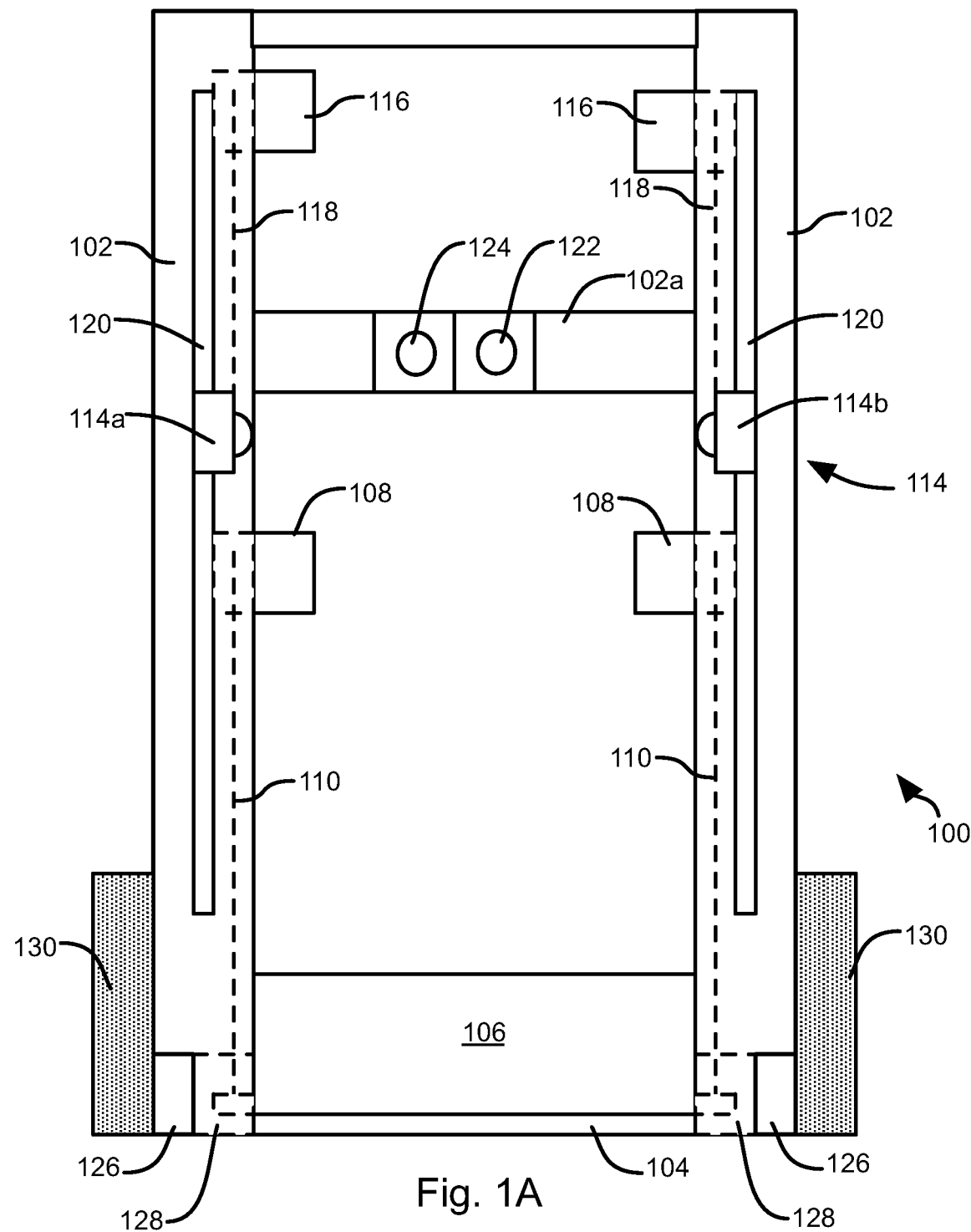
FIG. 1A is a front view of a dolly in accordance with an embodiment of the present invention.
Figure 1B:
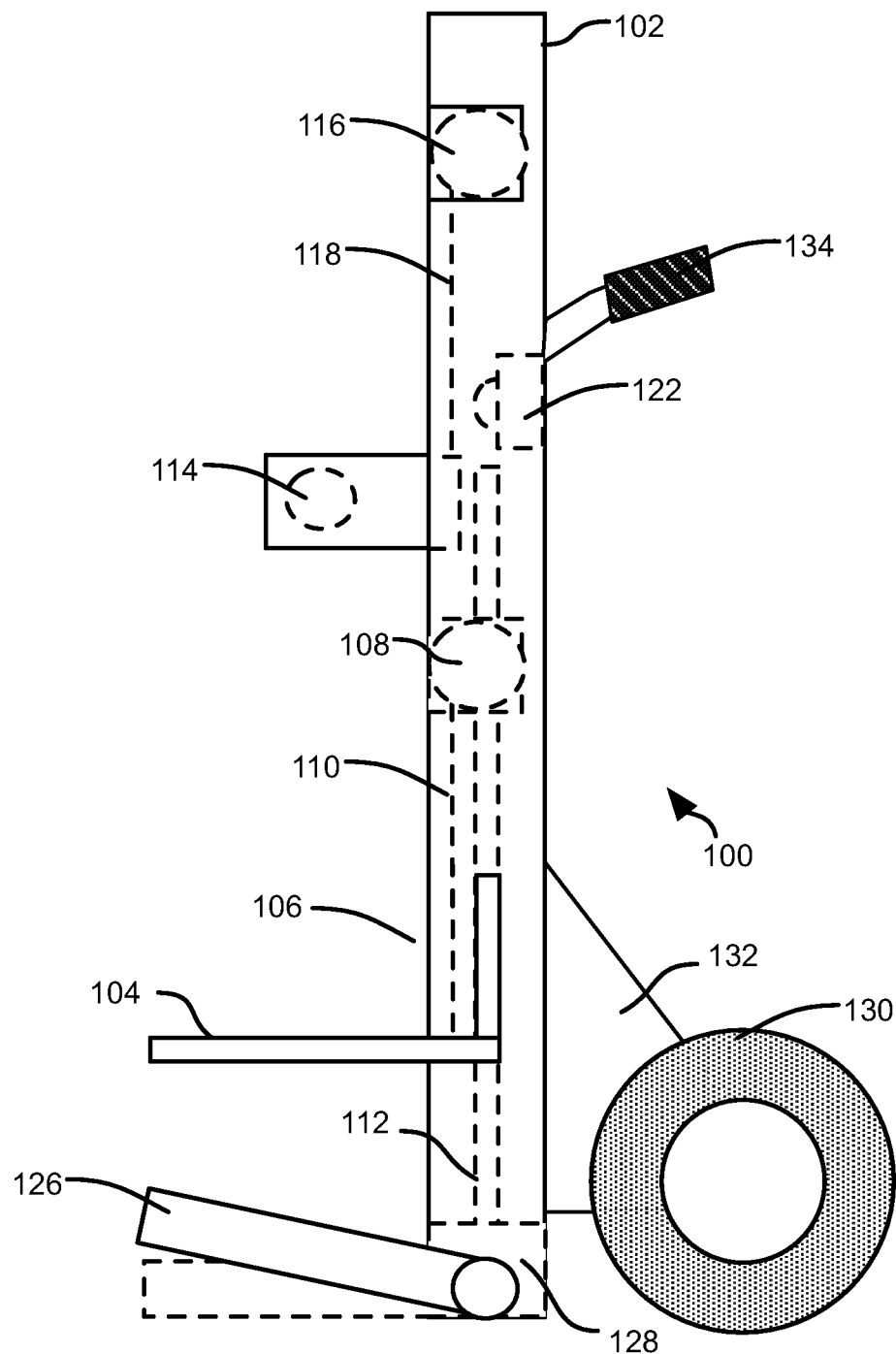
FIG. 1B is a side view of a dolly in accordance with an embodiment of the present invention.

Referring to FIGS. 1A and 1B, a dolly 100 may include a frame 102 and a platform 104 that is movable with respect to the frame 102 in order to raise and lower the platform 104 to facilitate loading. In some embodiments a back panel 106 may secure to the platform 104 to retain boxes and other items on the platform 104.

A platform actuator 108 may engage the platform 104 in order to raise and lower the platform 104. The platform actuator 108 may be embodied as an electric motor, electric motor driving a hydraulic pump, gas or propane motor, pneumatic motor, or other type of actuator. The platform actuator 108 may be coupled to the platform 104 by means of a cable 110, chain 110, belt 110, threaded rod 110, hydraulic piston 110, or other coupling mechanism. A power source (not shown) such as a battery, gas tank, propane tank, pressurized air tank, or other power source may also mount to the frame 102 or be separate from the frame and coupled to the platform actuator 108 by means of an electrical cable or hose.

In the illustrated embodiment, the platform 104 and/or back panel 106 engage grooves 112 or rails 112 (FIG. 1B) secured to the frame 102 in order to constrain the platform 104 to move vertically in response to force applied by the actuator 108.

An obstruction sensor 114 is mounted to the frame 102. The obstruction sensor 114 may include an emitter 114a and a sensor 114b mounted on opposite sides of the platform 104 and protruding horizontally over the platform 104. In this manner, an item placed on the platform 104 will block light from the emitter 114a from reaching the sensor 114b, thereby providing an indication of obstruction in the output of the sensor 114b. The emitter 114a may be a laser emitter, infrared emitter, or other type of emitter.

The obstruction sensor 114 may be raised and lowered by one or more obstruction sensor actuators 116 in order to raise and lower the obstruction sensor 114. The obstruction sensor actuators 116 may each be embodied as an electric motor, electric motor driving a hydraulic pump, gas or propane motor, pneumatic motor, or other type of actuator. Each obstruction sensor actuators 116 may be coupled to the obstruction sensor 114, e.g. one of the emitter 114a and the sensor 114b, by means of a cable 118, chain 118, belt 118, threaded rod 118, hydraulic piston 118, or other coupling mechanism.

A power source (not shown) such as a battery, gas tank, propane tank, pressurized air tank, or other power source may also mount to the frame 102 or be separate from the frame and coupled to the obstruction sensor 114 by means of an electrical cable or hose. The power source for the obstruction sensor 114 may be the same as that powering the platform actuator 108.

In the illustrated embodiment, the emitter 114a and sensor 114b engage one or more grooves 120 or rails 120 (FIG. 1B) secured to the frame 102 in order to constrain the sensor 114, to move vertically in response to force applied by the actuator 108. In the illustrated embodiment, the emitter 114a and sensor 114b engage separate grooves 120 or rails 120.

One or both of a camera 122 and a depth sensor 124 may be mounted to the frame 102. The camera 122 is preferably mounted to the frame 102 such that a face of a typical user, or users having a range of heights, will be positioned in the field of view of the camera 122 when standing in front of the dolly 100. The camera 122 may have a wide-angle lens such that faces of users having a wide range of heights will be in the field of view of the camera 122.

The depth sensor 124 may be mounted at the same height as the camera 122 or at a different location. In the illustrated embodiment, the depth sensor 124 and camera 122 are mounted to a frame member 102a spanning the dolly 100 horizontally. The depth sensor 124 may be embodied as a SONAR (sound navigation and ranging) sensor, RADAR (radio distance and ranging), LIDAR (light distance and ranging), or other type of sensor that is able to sense an object and the distance to it. In some embodiments, rather than using a depth sensor 124, two cameras 122 are used in order to provide depth perception.

In some embodiments, a fixed or retractable stand 126 is mounted to the frame and protrudes horizontally from the frame 102 in the same direction as the platform 104. The stand 126 preferably protrudes sufficiently to prevent tipping of the dolly 100 when the platform 104 is raised and items are placed on the platform 104.

Where the stand 126 is retractable, arms of the stand 126 may mount to one or more actuators 128 that can pivot the stand 126 upward or inward. As shown in FIG. 1B, the stand 126 pivots about a horizontal axis. In other embodiments, the stands 126 pivot about a vertical axis between a deployed position protruding outwardly from the frame 102 and a stowed position wherein the stand is folded closer the frame 102 than in the deployed position.

Wheels 130 mount to the frame 102 and may protrude from an opposite side of the frame 102 than the side from which the platform 104 and stand 126 protrudes. In the illustrated embodiment, the wheels 130 are mounted to brackets 132 that protrude from the frame 102. The wheels 130 may be powered by a motor and may be coupled to a gyroscopic control system that enables automatic balancing of the dolly 100 and movement in response to user inputs. Handles 134 may also mount to the frame to facilitate tipping and pushing of the dolly 100.

Figure 1C:
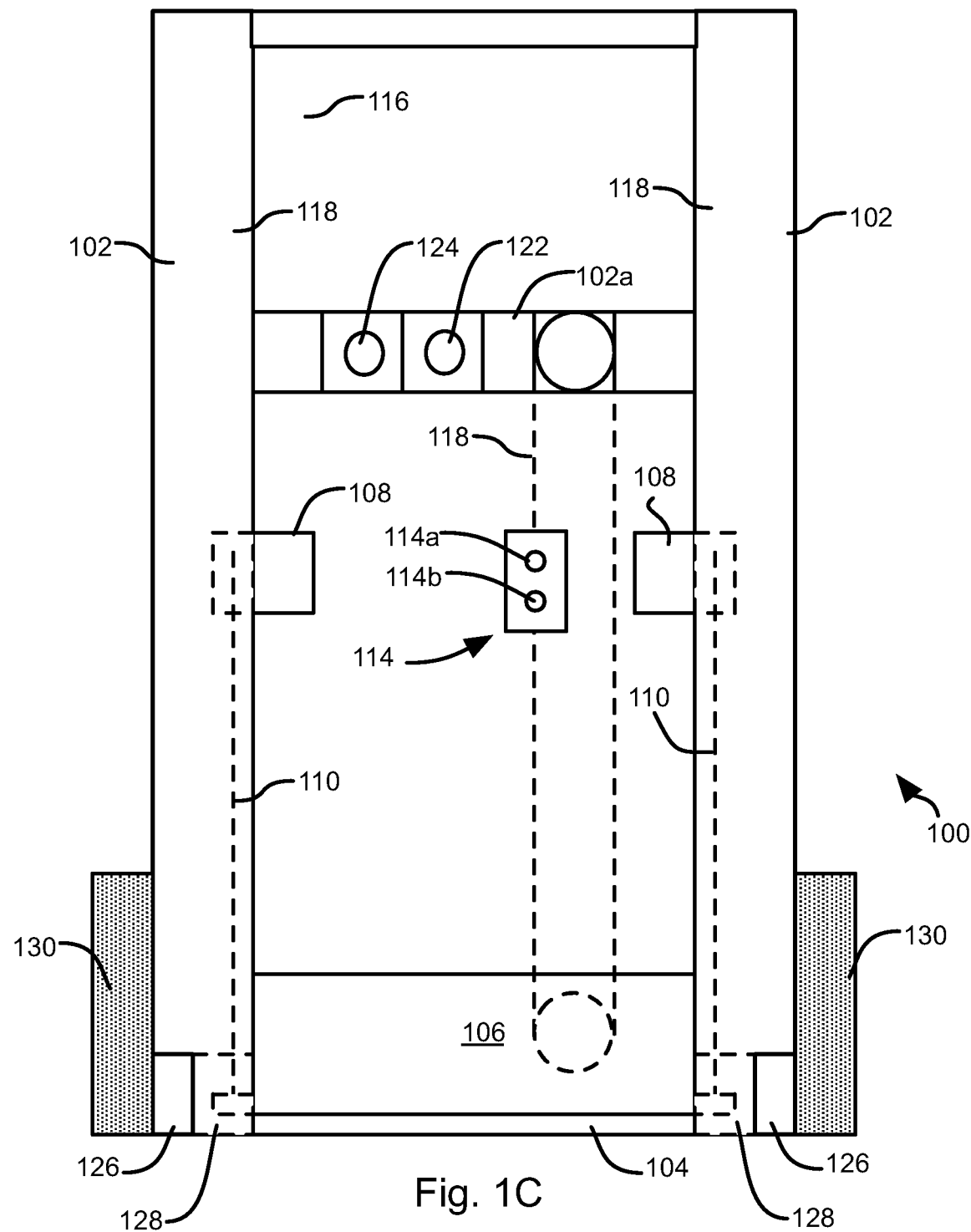
FIG. 1C is a front view of an alternative dolly in accordance with an embodiment of the present invention.

Referring to FIG. 1C, in some embodiments, the emitter 114a and sensor 114b are co-located such that an increase in sensed light indicates the presence of an obstruction reflecting light from the emitter 114a onto the sensor 114b. Where the obstruction sensor 114 is a single unit, the obstruction sensor actuator 116 may mount next to the camera 122 and depth sensor 124, such as to the same frame member 102a. In the illustrated embodiment, the obstruction sensor 114 mounts to a cable 118 or belt 118 that does not require a rail or groove formed in the frame 102. In other embodiments, the obstruction sensor 114 may engage may engage a single groove or rail of the frame 102.

Figure 2:
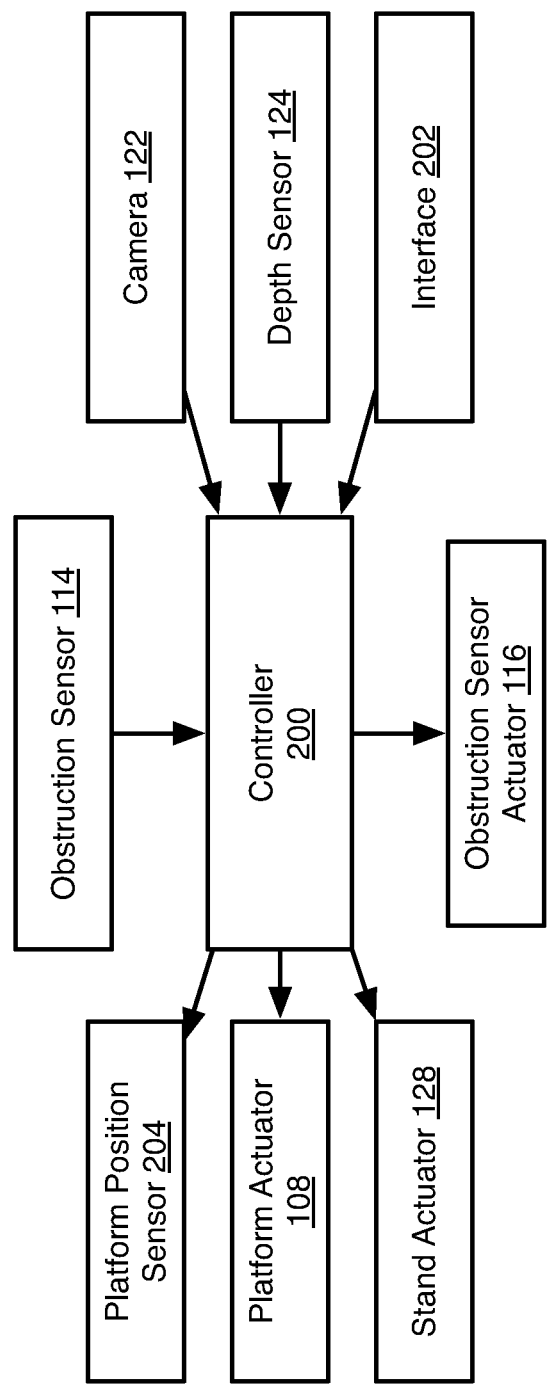
FIG. 2 is a schematic block diagram of components of a dolly in accordance with an embodiment of the present invention.

Referring to FIG. 2, the platform actuator 108, obstruction sensor 114, obstruction sensor actuator(s) 116, camera 122, depth sensor 124, and stand actuator 128 may be coupled to a controller 200.

In some embodiments, an interface 202 may be coupled to the controller 200. The interface may include at least one button for instructing the controller that the user has completed loading of the dolly 100. In some embodiments, other interface elements may be included that allow the user to initiate measurement of the user and setting of the initial position of the platform 104 as described in detail below. In some embodiments, rather than buttons, the interface 202 may be implemented as a touch screen or other type of input device.

In some embodiments, the controller 200 may be further coupled to a platform position sensor 204. The platform position sensor 204 may be any location sensor known in the art. The position sensor 204 may be as simple as a button or other element that engages the platform 104 when it is in its lowest position, or within some tolerance (e.g. 1 inch) of the lowest position of the platform 104 such that the controller 200 can sense when the platform is at its lowest position. In other embodiments, the position sensor 204 may sense the location of the platform 104 along its entire travel. In some embodiments, the platform position sensor 204 may be incorporated into the platform actuator 108 such that the position of the platform 104 may be inferred by the controller 200 from movements of the platform 104 invoked by the controller 200.

Figure 3:
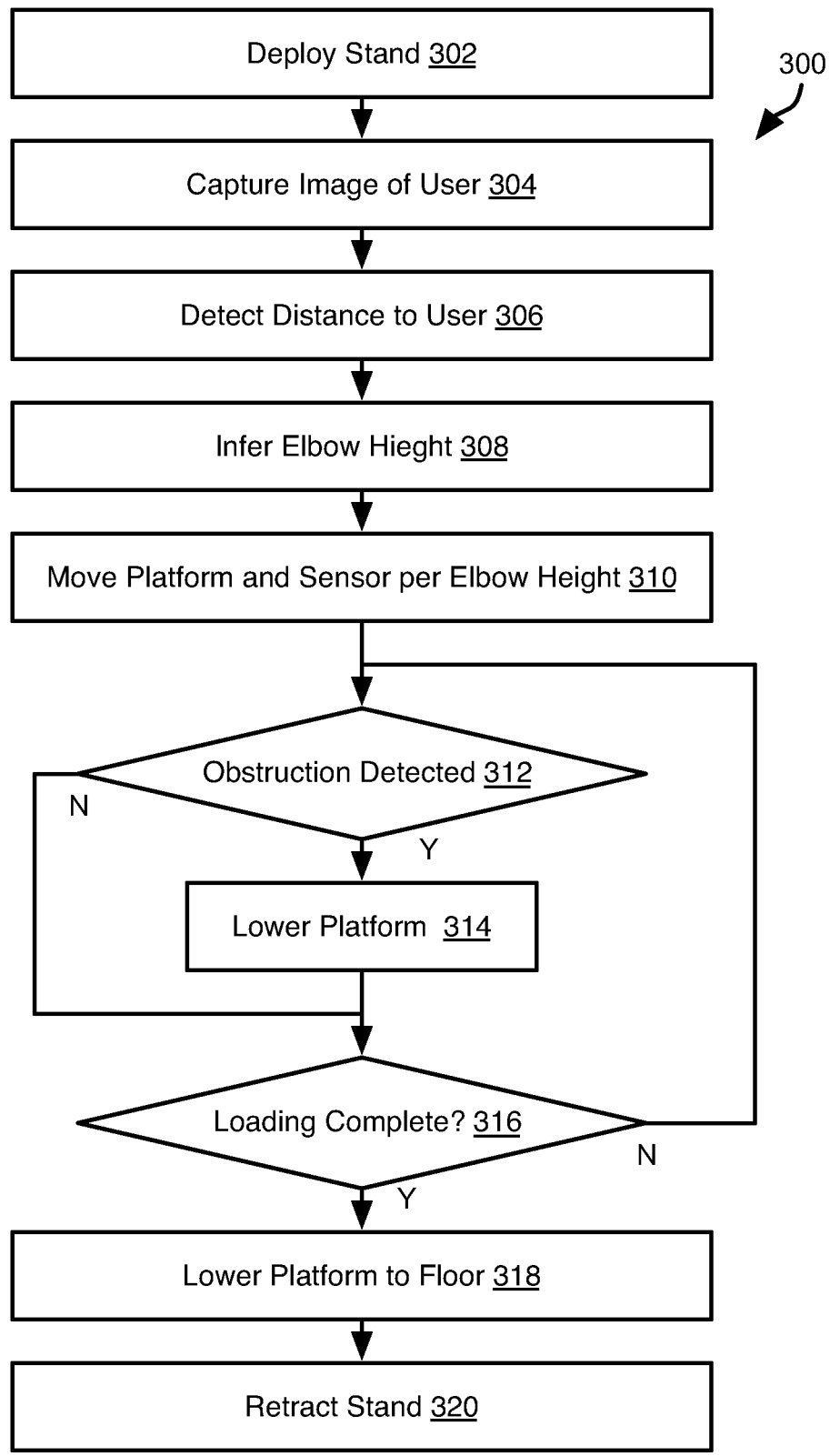
FIG. 3 is a process flow diagram of a method for operating a dolly in accordance with an embodiment of the present invention.

Referring to FIG. 3, the illustrated method 300 may be executed by the controller 200 in response to inputs from a user. The method 300 may include deploying 302 the stand 126, such as by invoking movement of the stand 126 by the stand actuators 128. In other embodiments, deployment 302 is performed manually or the stands 126 are fixed such that step 302 may be omitted.

The method 300 may further include capturing 304 an image of the user and detecting 306 a distance to the user. Capturing 304 the image may be performed by receiving the output of the camera 122 and detecting 306 the distance may be performed by the controller based on the output of the depth sensor 124. In other embodiments, depth may be detected by analyzing a pair of images from a pair of cameras 122 that are offset from one another by a known distance using any binocular vision algorithm known in the art.

Figure 4A:
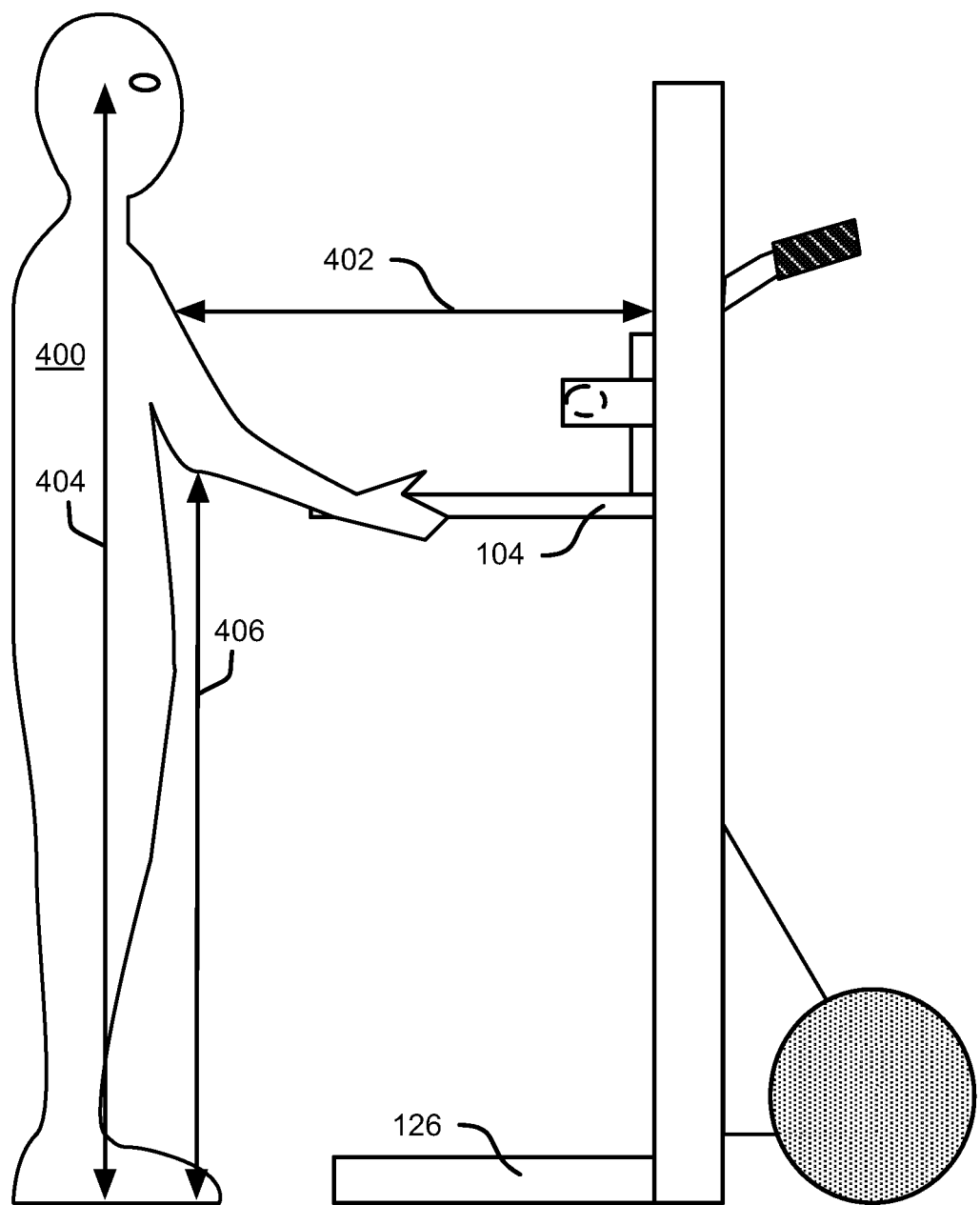
FIGS. 4A to 4E are side views illustrating operation of a dolly in accordance with an embodiment of the present invention.

The method 300 may further include inferring 308 an elbow height of the user based on the image of step 304 and the distance of step 306. Referring to FIG. 4A, while still referring to FIG. 3, inferring 308 the elbow height of the user may include identifying an eye of the user in the image, i.e. vertical pixel position. This may include using any image analysis technique known in the art to identify a face and one or both eyes in a face.

Using the distance of step 306 and the height of the eye of the user in the image, an actual height 404 of the eye of the user may be calculated. For example, the height of the camera 122 may be input to the controller 200. The vertical height of the eye in the image and the distance may be used to calculate a height relative to the camera 122 using any geometric technique known in the art for determining the height of an object. For example, the camera may be calibrated using repeated measurements to obtain a function $h=f(h_p,D)$, where h is the height relative to the camera, $h_p$ is the height in pixels of an object, and D is the estimated distance to the object.

Once the eye height of the user is estimated, the elbow height 406 of the user may be estimated as a percentage of that eye height. For example, 60 percent, or some other experimentally determined value.

The method 300 may further include moving 310 the platform 104 and obstruction sensor 104 according to the inferred elbow height. In particular, the controller 200 may cause the platform actuator 108 to move the platform 104 to the elbow height, or within some window including the elbow height, e.g. within +/−2 inches. The controller 200 may cause the obstruction sensor actuator 116 to move the obstruction sensor 114 to a position above the platform 104, e.g. between 4 and 6 inches above the platform 104.

If obstruction is detected 312 based on an output of the obstruction sensor 104, then the controller invokes lowering 314 of the platform 104 until the obstruction sensor 114 no longer detects obstruction or some minimum amount, e.g. between 4 and 6 inches, such as which ever distance is greater.

The method 300 may further include detecting 316 whether loading is complete. This may include detecting an input from the user indicating that loading is complete or detecting movement of the platform to its lowest position. If loading is determined 316 to be complete and the platform 104 is not at its lowest position it is lowered 318 to its lowest position. If loading is determined 316 to be complete, then the stand is also retracted 320, such as by causing the stand actuators 128 to move the stand to a retracted position. If the stand is not retractable or is manually retractable, this step may be omitted. If loading is not complete 316, then steps 312 and 314 are repeated until completion of loading is detected 316.

Figure 4B:
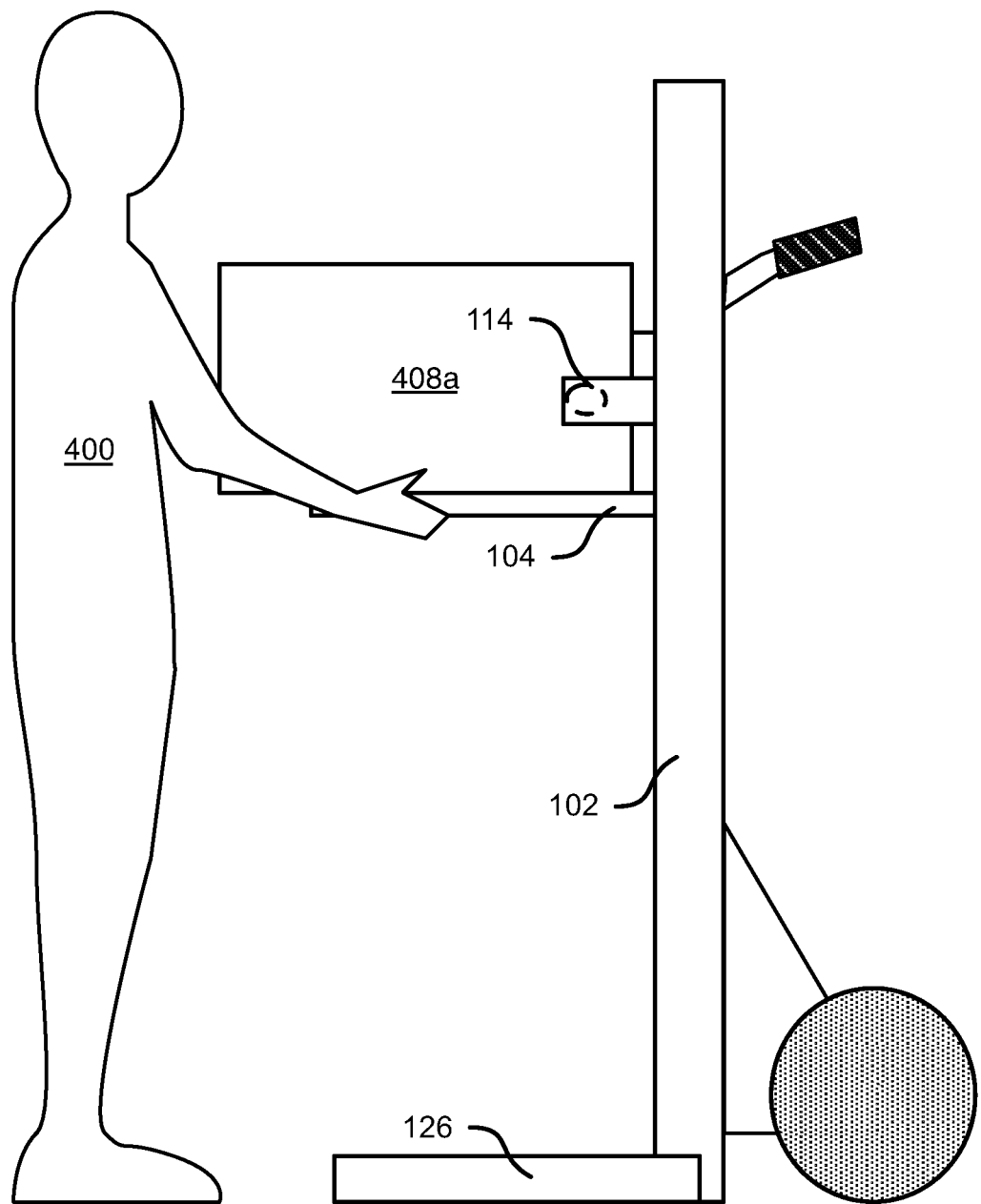
Figure 4C:
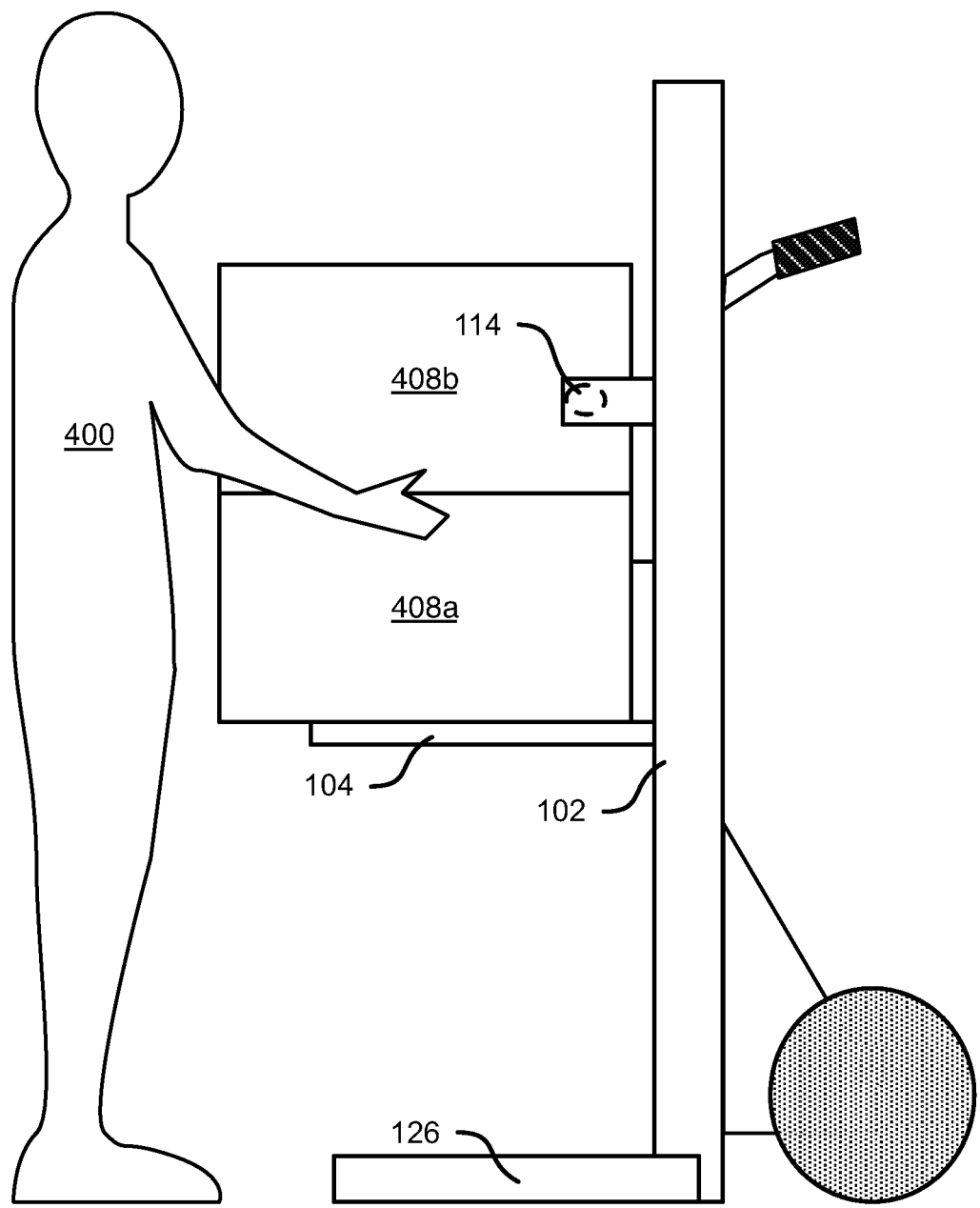
Figure 4D:
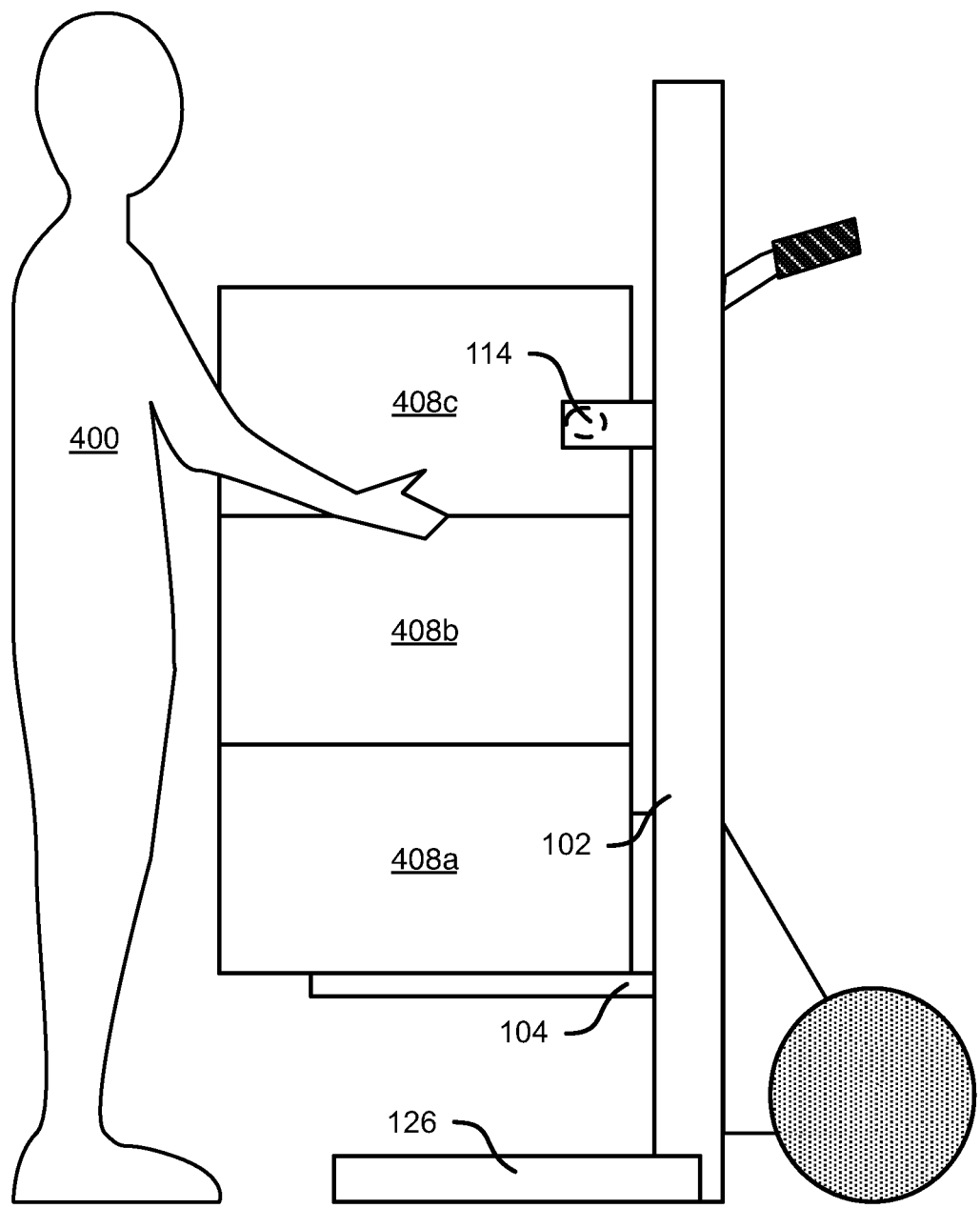

The processing of steps 312-320 may be understood with respect to FIGS. 4B to 4E. Referring specifically to FIG. 4B, the user places an initial box 408a on the platform 104. This obstructs the obstruction sensor 114, which causes the controller 200 to invoke lowering of the platform 104 either a minimum amount or until the obstruction sensor is no longer obstructed, such as whichever is larger in some embodiments, as shown in FIG. 4C. The user may then proceed to add additional boxes 408b-408c, which causes further lowering of the platform 104, as shown in FIG. 4D.

Figure 4E:
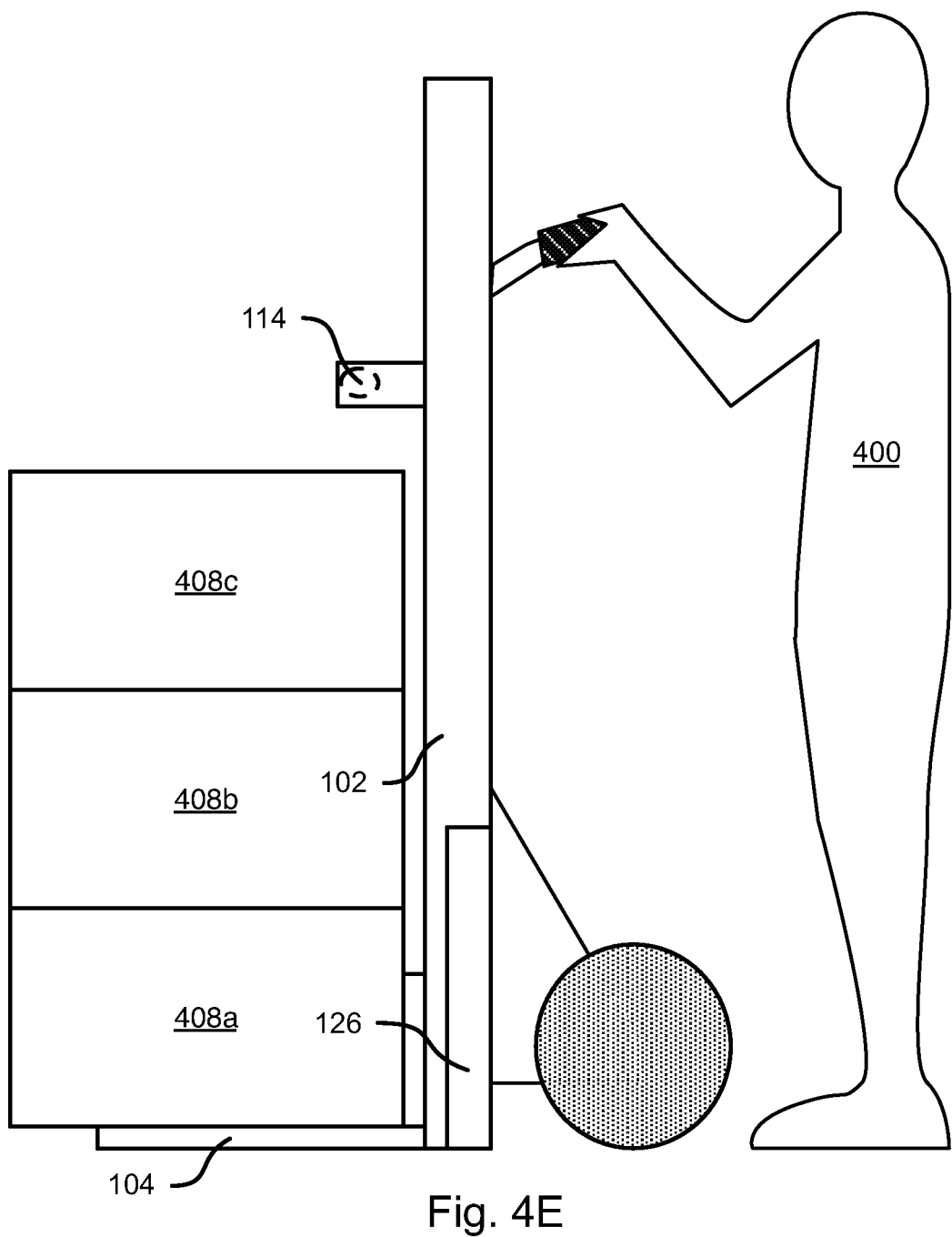

If the user completes loading before the platform reaches its lowermost position, the user may provide an input indicating that loading is complete, such as through the interface 202. If so, the platform 104 is then lowered to the lowest position and the stand 126 is retracted as shown in FIG. 4E.

Although the foregoing methods and system have been described with respect to a rolling dolly 100, they may also be applied to a stationary pallet loading system or other loading system, such as a scissor lift or other type of lifting system that functions as a platform actuator 108.

Figure 5:
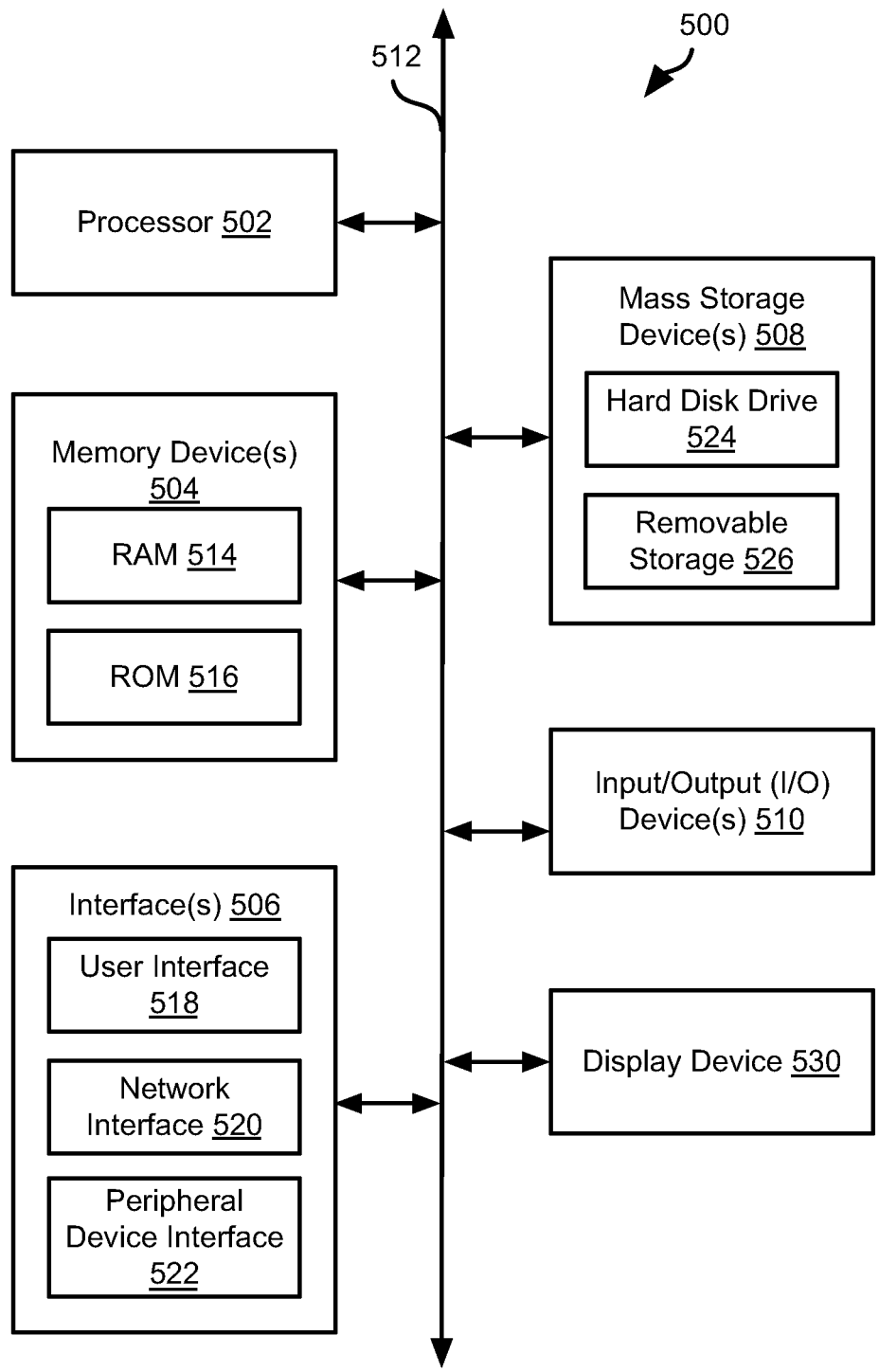
FIG. 5 is a schematic block diagram of a computing device that may be used to implement a controller in accordance with an embodiment of the present invention.

FIG. 5 is a block diagram illustrating an example computing device 500. Computing device 500 may be used to perform various procedures, such as those discussed herein. The controller 200 may have some or all of the attributes of the computing device 500.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, I/O device(s) 510, and display device 530 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
    a frame;
    a platform movably mounted to the frame;
    an actuator coupled to the platform and the frame and configured to raise and lower the platform;
    a sensor mounted to the frame, wherein the sensor includes a camera and a distance sensor; and a controller coupled to the actuator and the sensor, the controller programmed to cause the actuator to move the platform according to an inferred elbow height of a user determined according to an output of the sensor;
wherein the controller is further programmed to infer the elbow height of the user according to the output of the sensor by:
infer a horizontal distance to the user according to an output of the distance sensor;
determine an image position of an eye of the user according to an output of the camera;
infer a vertical position of the eye of the user according to the image position of the eye of the user and the horizontal distance to the user; and
calculate the elbow height as a function of the vertical position of the eye of the user.

2. The apparatus of claim 1, further comprising wheels mounted to the frame.

3. The apparatus of claim 1, wherein the sensor includes a camera.

4. The apparatus of claim 1, further comprising an obstruction sensor coupled to the controller, the controller further programmed to:
detect obstruction of the obstruction sensor; and
in response to detection of obstruction of the obstruction sensor, cause the actuator to lower the platform.

5. The apparatus of claim 4, wherein the actuator is a first actuator, the apparatus further comprising a second actuator coupled to the frame and the obstruction sensor; and
wherein the controller is further programmed to cause the second actuator to adjust a vertical position of the obstruction sensor according to the elbow height of the user.

6. The apparatus of claim 5, wherein the obstruction sensor comprises a light emitter and a light detector, the controller being further programmed to:
detect obstruction of the obstruction sensor in response to detecting a change in an output of the light detector.

7. The apparatus of claim 1, further comprising an input device coupled to the controller, the controller further programmed to:
in response to receiving an input from the input device, cause the actuator to lower the platform to a lowest position.

8. The apparatus of claim 7, further comprising a stand and a stand actuator coupled to the controller, the stand having, the controller being further programmed to:
in response to receiving the input from the input device, cause the stand to retract.

9. The apparatus of claim 8, wherein the controller is further programmed to:
detect movement of the platform to a lowest position; and
in response to detecting movement of the platform to the lowest position, cause the stand to retract.

10. A method comprising:
providing an apparatus including
a frame;
a platform movably mounted to the frame;
an actuator coupled to the platform and the frame and configured to raise and lower the platform;
a sensor mounted to the frame;
an obstruction sensor; and
a controller coupled to the actuator, the obstruction sensor, and the sensor;
receiving, by the controller, an output of the sensor;
inferring an elbow height of a user according to the output of the sensor;
causing the actuator to adjust a vertical position of the platform according to the elbow height;
detecting, by the controller, obstruction of the obstruction sensor; and
in response to detection of obstruction of the obstruction sensor, causing, by the controller, the actuator to lower the platform.

11. The method of claim 10, wherein the apparatus further includes wheels mounted to the frame.

12. The method of claim 10, wherein the sensor includes a camera.

13. The method of claim 10, wherein the sensor includes a camera and a distance sensor, the method further including inferring the elbow height of the user according to the output of the sensor by:
inferring, by the controller, a horizontal distance to the user according to an output of the distance sensor;
determining, by the controller, an image position of an eye of the user according to an output of the camera;
inferring, by the controller, a vertical position of the eye of the user according to the image position of the eye of the user and the horizontal distance to the user; and
calculating, by the controller, the elbow height as a function of the vertical position of the eye of the user.

14. The method of claim 10, wherein the actuator is a first actuator, the apparatus further comprising a second actuator coupled to the frame and the obstruction sensor, the method comprising:
causing, by the controller, the second actuator to adjust a vertical position of the obstruction sensor according to the elbow height of the user.

15. The method of claim 14, wherein the obstruction sensor comprises a light emitter and a light detector, the method further comprising:
detecting, by the controller, obstruction of the obstruction sensor in response to detecting a change in an output of the light detector.

16. The method of claim 10, wherein the apparatus further comprises an input device coupled to the controller, the method further comprising:
in response to receiving an input from the input device, causing, by the controller, the actuator to lower the platform to a lowest position.

17. The method of claim 16, wherein the apparatus further comprises a stand and a stand actuator coupled to the controller, the method further comprising:
in response to receiving the input from the input device, causing, by the controller, the stand to retract.

18. The method of claim 17, further comprising:
detecting, by the controller, movement of the platform to a lowest position; and
in response to detecting movement of the platform to the lowest position, causing, by the controller, the stand to retract.

19. An apparatus comprising:
a frame;
a platform movably mounted to the frame;
an actuator coupled to the platform and the frame and configured to raise and lower the platform;
a sensor mounted to the frame;
an input device;
a stand;
a stand actuator; and
a controller coupled to the actuator, the sensor, the input device, and the stand actuator, the controller programmed to:

cause the actuator to move the platform according to an inferred elbow height of a user determined according to an output of the sensor;
in response to receiving an input from the input device, cause the actuator to lower the platform to a lowest position; and
in response to receiving the input from the input device, cause the stand to retract.

\* \* \* \* \*